3,689,371
RECOVERY OF BUTANOLS PLURAL STAGE DISTILLATION AND ALKALI METAL HYDROXIDE TREATMENT
Horst Kerber, 10 Gontardstrasse; and Heinz Hohenschutz, 12 Leibnitzstrasse, both of 6800 Mannheim, Germany; and Konrad Rauch, 7 Donnersbergstrasse; and Walter Scheidmeir, 56 Carl-Bosch-Strasse, both of 6703 Limburgerhof, Germany
Continuation-in-part of application Ser. No. 785,702, Dec. 20, 1968. This application Nov. 11, 1971, Ser. No. 197,760
Int. Cl. B01d *3/00;* C07c *29/24*
U.S. Cl. 203—37                                   6 Claims

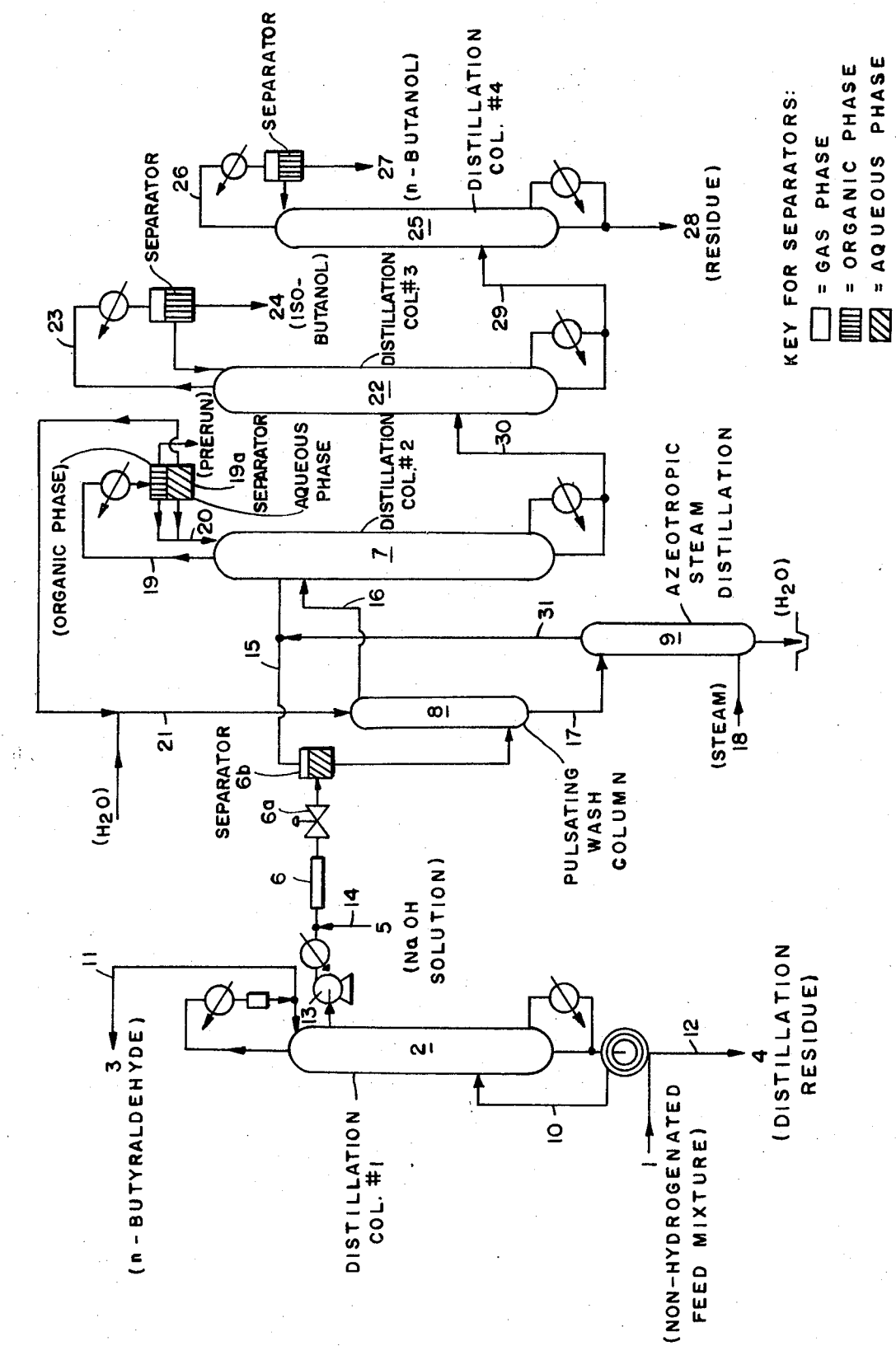

ABSTRACT OF THE DISCLOSURE

A process for the recovery of butanols from a reaction mixture containing butanols which has been obtained by reaction of propylene with carbon monoxide and hydrogen in the presence of hydroformylation catalysts, particularly cobalt carbonyl compounds, at elevated temperature and under superatmospheric pressure followed by distilling off the greater part of the butyraldehyde formed, wherein without previous hydrogenation the reaction mixture is first subjected to distillation to separate a crude butanol mixture which is devoid of butyraldeheyde and compounds boiling above 150° C., this is treated with an aqueous solution of an alkali metal hydroxide, the organic phase obtained (which may if desired be washed with water) is distilled while separating azeotrope-forming substances in the presence of water with simultaneous dehydration, and the butanol mixture thus obtained is separated by distillation into n-butanol and isobutanol. Butanols are important solvents and intermediates, for example for the production of esters.

This application is a continuation-in-part application of Ser. No. 785,702, filed Dec. 20, 1968.

The present invention relates to an improved process for the recovery of butanols from reaction mixtures which have been obtained by hydroformylation of propylene and distilling off the greater part of the butyraldehyde formed.

It is known that a mixture of butyraldehydes and butanols is obtained from propylene by reaction with carbon monoxide and hydrogen in the presence of carbonyl compounds of iron, rhenium, rhodium, ruthenium, iridium and particularly of cobalt as catalysts at elevated temperature and under superatmospheric pressure. In addition to aldehydes and alcohols, the reaction mixture contains small amounts of a large number of other products which have been formed in side reactions or secondary reactions. Examples of such products are hydrocarbons, ethers, esters, acetals, glycols or ketones having four to twelve carbon atoms.

It is often desirable to recover from the reaction mixture the primary products of hydroformylation, namely n-butyraldehyde and isobutyraldehyde, for example when it is desired to prepare 2-ethylhexanol from n-butyraldehyde. In this case the butyraldehydes are substantially distilled off from the reaction mixture, advantageously after the cobalt catalyst has been separated. Complete separation of the aldehyde by distillation is dispensed with because this would involve very high energy costs. The distillation residue therefore contains about 0.5 to 5% by weight of butyraldehyde. It is not possible to separate the butanols from the distillation residue in a pure form merely by batchwise or continuous rectification, even when several series-connected distillation columns are used. Treatment of the crude butanol mixture with caustic soda solution or caustic potash solution to hydrolyze the esters contained in the butanol mixture does not improve the result of the rectification. Pure butanols are however obtained when the distillation residue is hydrogenated prior to rectification. For the hydrogenation of the residue, particularly of the dipropylketone contained therein, very high pressures, high temperatures as well as highly active catalysts are necessary, so that the expenditure for the process is considerable.

The object of this invention is to provide a process for the recovery of butanols from reaction mixtures which have been obtained by hydroformylation of propylene and distilling off the greater part of the butyraldehyde formed, the said process being simpler than prior art methods with at least equal success.

In accordance with this invention this and other objects and advantages are achieved in a process for the recovery of butanols from a reaction mixture containing butanols which has been obtained by reaction of propylene with carbon monoxide and hydrogen in the presence of a hydroformylation catalyst, particularly a cobalt carbonyl compound, at elevated temperature followed by distilling off the greater part of the butyraldehyde formed, wherein without previous hydrogenation the reaction mixture is first subjected to distillation to separate a crude butanol mixture which is devoid of butyraldehyde and compounds boiling above 150° C., this is treated with an aqueous solution of an alkali metal hydroxide, the organic phase obtained (which may if desired be washed with water) is distilled while separating azeotrope-forming substances in the presence of water with simultaneous dehydration, and the butanol mixture thus obtained is separated by distillation into n-butanol and isobutanol.

According to the process of the invention, the starting mixture obtained after the greater part of the butyraldehyde, as a rule at least 85% by weight, preferably 90 to 98% by weight of butyraldehyde, has been distilled off, is distilled in a first distillation column, a fraction being withdrawn which still contains the butyraldehyde contained in the reaction mixture and which for further processing is advantageously supplied to the reaction mixture directly obtained by hydroformylation of propylene or the reaction mixture which has already been freed from cobalt. The main product withdrawn is a crude mixture consisting essentially of n-butanol and isobutanol, while the constituents boiling above 150° C. remain as a residue.

The distillation of the starting mixture is preferably carried out at a pressure of from 500 to 800 mm. and a reflux ratio of from 0.5 to 2, the reflux ratio being the ratio by weight of reflux to alcohol withdrawn. The starting mixture to be distilled is supplied as a liquid or a mixture of liquid and vapor, advantageously at the boiling temperature, to the distillation column, and it may be preheated in heat exchange with for example the effluent bottoms product. When the reaction mixture is supplied as a mixture of liquid and vapor, it is advantageous to carry out the partial evaporation in a falling film evaporator. The fraction containing butyraldehyde is withdrawn at the top of the distillation column. It is advantageous to carry out the distillation so that the whole of the water present in the mixture to be distilled is also contained in the fraction withdrawn at the top. A crude mixture consisting essentially of n-butanol and isobutanol is withdrawn from the column as a side stream, for example at about five theoretical trays below the top of the column. At the bottom of the column the compounds boiling at temperatures above 150° C. such as 2-ethylhexanol, dibutylacetals and other compounds containing hydroxyl groups and having eight and more carbon atoms as well as their butyric esters are withdrawn.

Said crude mixture consisting essentially of n-butanol and isobutanol is treated with an aqueous solution of an alkali metal hydroxide. It is preferable to use aqueous caustic soda solution and/or aqueous caustic potash solution. The concentration of alkali metal hydroxide in the aqueous solution is advantageously from 20 to 50% by weight. It is advantageous to use an amount of alkali metal hydroxide which is required stoichiometrically for neutralization and hydrolysis of the acids and esters contained in the crude butanol mixture or an excess of up to about 20 mole percent above the said amount. Hydrolysis is carried out at a temperature of from 80° to 200° C., particularly from 120° to 190° C. Pressures of from atmospheric pressure to about 50 atmospheres, preferably from 1.5 to 25 atmospheres, are used. It is advantageous to add the aqueous caustic alkali solution to the butanol mixture which has already been heated up to reaction temperature. It is preferable to carry out the hydrolysis continuously, for example by allowing a mixture of the crude butanols and the aqueous alkali metal hydroxide solution to flow through a heated tube system, residence times of from about ten seconds to thirty minutes generally being maintained.

The resulting mixture obtained by this hydrolysis and consisting essentially of n-butanol, isobutanol and an aqueous alkali metal hydroxide solution can be processed in two ways. It is possible, particularly when caustic potash solution has been used for the hydrolysis, to subject the resulting mixture (without separating the alkali metal salt) to further processing according to this invention. It is also possible to separate the alkali metal salts formed. The separation of the alkali metal salts may be done for example by washing with water the abovementioned mixture obtained from the hydrolysis, for example using the aqueous phase obtained at the top of the column used for separating the azeotrope-forming substances. The washing of the said mixture is preferably carried out continuously, for example by passing water countercurrent to said mixture in a column having advantageously from two to ten theoretical trays. The countercurrent extraction is advantageously carried out in a column provided with sieve plates or in a column provided with tower packing. Extraction can be improved by pulsating the liquid in the column.

The greater part (generally from about 75 to 97% by weight) of the butanol may be first distilled off and advantageously transferred in vapor phase to the column required for further processing, the distillation residue freed from the alkali metal salts by washing with water and the organic phase obtained supplied in liquid phase to the same column.

The mixture consisting essentially of n-butanol, isobutanol and an aqueous alkali metal hydroxide solution obtained after hydrolysis or the mixture consisting essentially of n-butanol, isobutanol and water which is obtained after removal of the alkali metal salt and which generally contains from 5 to 20% by weight of water, is distilled in a second distillation column at the top of which azeotrope-forming substances such as dibutyl ether, hydrocarbons and dipropyl ketones contained in said mixture as impurities are separated together with water and part of the isobutanol as a ternary azeotrope.

A packed column or plate type column advantageously having from thirty to one hundred theoretical trays may be used for separating the substances forming azeotropes. Columns provided with bubble trays, valve plates or sieve plates are preferred. Separation of the azeotropes may be carried out for example by feeding in the butanol mixture obtained by hydrolysis advantageously at about eight to thirty trays below the top of the column and withdrawing from the product taken off at the top of the column (which comprises an aqueous phase and an organic phase) such an amount of the organic phase that a butanol concentration of less than 65% by weight is set up. The aqueous phase is advantageously returned to the column in such an amount that there is formed below the point of supply a zone of at least four and advantageously from six to twenty-five theoretical trays in which the water content is from about 8 to 25%, advantageously from 15 to 22%, by weight. In this zone containing water the temperature is below 100° C. at atmospheric pressure. The composition of the reflux is different from that of the distillate. It is advantageous to use a molar reflux ratio of from 3 to 12.

At the bottom of this second distillation column and anhydrous mixture consisting essentially of n-butanol and isobutanol is withdrawn and is then separated into its components in known manner by distillation, for example using a single distillation column, from which pure isobutanol is removed at the top, vaporous pure n-butanol is withdrawn from the stripping section and condensed, and a residue is obtained as the bottoms. This bottoms residue contains from 5 to 85% by weight of n-butanol and also compounds of higher boiling point. The residue may be added to the reaction mixture to be used as starting material according to the invention. It is also possible however to extract the n-butanol present in the residue with water, for example with ten times the volume of water with reference to the volume of n-butanol, the constituents of the residue which are insoluble in water being thus separated. The alcohol is advantageously isolated from the mixture of n-butanol and water by azeotropic distillation. The latter treatment of the residue is advantageously carried out when the alkali metal salt has not been separated after the hydrolysis.

The process according to the invention is illustrated by the following example which is given with reference to the drawing.

EXAMPLE 1000 kg. of an unhydrogenated mixture 1 having the composition given in Table 1 under FP (feed product) in percent by weight, which contains 5% by weight of water, is supplied per hour through line 10 to the tenth tray of the column 2 provided with fifty bubble trays. A molar reflux ratio of 1.5 is maintained between the supply and the withdrawal of the side stream. 34.3 kg. per hour of n-butyraldehyde 3 having a water content of 3% by weight is withdrawn from the top of the column through line 11. A temperature of about 180° C. is maintained in the bottoms of the column 2 and 266 kg. per hour of distillation residue 4 which is completely devoid of water is taken off through line 12.

700 kg. per hour of liquid crude butanol mixture is withdrawn at the 32nd tray of the column through line 13, compressed to 15 atmospheres gauge and heated with steam to 150° C. Then 5 kg. per hour of 25% by weight caustic soda solution 5 is pumped in through line 14 and the ester contained in the mixture is hydrolyzed with a residence time of thirty-five seconds in a flow tube 6. The liquid mixture is then released from pressure by valve 6a into separator 6b. The mixture of gaseous water and butanol thus evaporated is allowed to flow through line 15 into the forerun column 7. The liquid phase from separator 6b is washed in column 8 with 300 liters per hour of water and aqueous phase from the distillate of column 7.

Column 8 is filled with Pall rings and the liquid in this column is set pulsating by a pulsating pump having a frequency of about 100 minute$^{-1}$ and at an amplitude of 2 to 5 mm. The dissolved butanol withdrawn from the bottom of column 8 through line 17 is expelled from the aqueous layer azeotropically with steam 18 in a column 9 having ten trays and is then passed through line 31 via line 15 in vapor phase into the forerun column 7. Similarly the organic phase from column 8 which is almost free from sodium salts is supplied through line 16 to the forerun column 7. Column "AS" of Table 1 gives the composition of the butanol mixture in percent by weight after hydrolysis.

A molar reflux ratio of 7:1 is maintained in the forerun column 7 which has fifty bubble trays, the point of supply being at the 38th tray. Such an amount of the aqueous phase from the product withdrawn at the top of the column through line 19, this product forming an aqueous phase and an organic phase in separator 19a, is returned to the column through line 20 such that boiling temperatures below 100° C. are maintained down to the 25th tray. The residual aqueous phase is used together with fresh water, both being introduced through line 21 into column 8 for extraction. Below the 25th tray of column 7 the temperature rises rapidly to 115° C. At the top of the column, 40 kg. per hour of water, 85 kg. per hour of isobutanol and 55 kg. per hour of first runnings components are withdrawn through line 19. An anhydrous mixture consisting essentially of n-butanol and isobutanol is fed into isobutanol column 22 through line 30. To separate isobutanol from n-butanol, the column 22 having 140 bubble trays is used. The reflux ratio during distillation is 5:1. Column 4 of Table 1 (heated IB) gives the composition of the isobutanol 24 taken off at the top of the column 22 through line 23 in percent by weight. The remaining mixture consisting essentially of n-butanol in few through line 29 to a column 25 having forty bubble trays where the n-butanol is separated at a reflux ratio of 0.8:1, its purity being given in percent by weight in column "NB" of Table 1. Supply through line 29 is effected in this column 25 at the 12th tray. Pure n-butanol 27 is obtained at the top of the column through line 26. A residue 28 is withdrawn at the bottom.

In a comparative test (I) a starting reaction mixture having the composition in percent by weight given in Table 2.1 under the heading FP (feed product) is hydrogenated first in contact with a catalyst containing 10% by weight of nickel on silicic acid at 270 atmospheres gauge and 195° C. and then in contact with a catalyst containing 40% by weight of nickel on silicic acid. The hydrogenation product has the composition in percent by weight given in column "HP" of Table 2.1. 0.8 metric ton per hour of the mixture to be hydrogenated is passed through per m.³ of reaction space. The hydrogenated product is first hydrolyzed and then rectified under the reaction conditions of the example. The butanols have the compositions given in Table 2.1 in columns "IB" and "NB" in percent by weight. The butanols obtained according to the example and according to the comparative test (I) are of comparable purity.

In a comparative test (II) the same starting reaction mixture as in test (I) (without previous hydrogenation and distillation) is hydrolyzed and then rectified under the reaction conditions of the example. The butanols obtained have the compositions in percent by weight given in columns "IB" and "NB" of Table 2.2. The butanols do not satisfy purity requirements. The butanols contain in particular butyraldehyde. The content of butyraldehyde is surprising because the reaction product from the hydrolysis contains no butyraldehyde as may be seen from Table 2.2, in column "AS."

Key to Tables:
FP=Feed Product
AS=After Saponification (Hydrolysis)
IB=Isobutanol Product
NB=n-Butanol Product
HP=Hydrogenated Product

TABLE 1

|  | FP | AS | IB | NB |
|---|---|---|---|---|
| Isobutyraldehyde | 0 | 0 | 0 | 0 |
| n-Butyraldehyde | 3.5 | 0 | 0 | 0 |
| Isobutanol | 22 | 33.5 | 99.95 | 0.0 |
| n-Butanol | 38 | 57.5 | 0.0 | 99.95 |
| Butyl formates | 2.5 | 0.0 | 0.0 | 0.0 |
| Dipropyl ketones | 1 | 1.0 | 0.03 | 0.04 |
| Other low-boiling products | 5 | 7.5 | 0.02 | 0.01 |
| Residue | 28 | 0.5 | 0.0 | 0.0 |

TABLE 2.1

|  | FP | HP | AS | IB | NB |
|---|---|---|---|---|---|
| Isobutyraldehyde | 0 | 0 | 0 | 0 | 0 |
| n-Butyraldehyde | 3.5 | 0 | 0 | 0 | 0 |
| Isobutanol | 22 | 24 | 24.5 | 99.95 | 0.0 |
| n-Butanol | 38 | 45 | 46.5 | 0.0 | 99.95 |
| Butyl formates | 2.5 | 0 | 0 | 0.0 | 0.0 |
| Dipropyl ketones | 1 | 0 | 0 | 0.0 | 0.0 |
| Other low-boiling products | 5 | 7 | 7 | 0.05 | 0.05 |
| Residue | 28 | 23 | 22 | 0.0 | 0.0 |

TABLE 2.2

|  | AS | IB | NB |
|---|---|---|---|
| Isobutyraldehyde | 0 | 0.6 | 0.4 |
| n-Butyraldehyde | 0 | 0.3 | 0.7 |
| Isobutanol | 22.5 | 98.85 | 0.0 |
| n-Butanol | 39.5 | 0.0 | 98.7 |
| Butyl formates | 0 | 0.0 | 0.0 |
| Dipropyl ketones | 1 | 0.05 | 0.1 |
| Other low-boiling compounds | 5 | 0.2 | 0.1 |
| Residue | 32 | 0.0 | 0.0 |

We claim:
1. A process for the recovery of n-butanol and isobutanol from a reaction mixture containing the same which has been obtained by reaction of propylene with carbon monoxide and hydrogen in the presence of a hydroformylation catalyst at elevated temperature and superatmospheric pressure followed by distilling off the greater part of the n-butyraldehyde and isobutyraldehyde formed, which process comprises:
(a) distilling off in a first distillation column from said reaction mixture, without previous hydrogenation, a crude mixture consisting essentially of n-butanol and isobutanol which is withdrawn from the distillation column as a side stream, while a fraction containing butyraldehyde is withdrawn at the top of the column and a fraction containing the compounds boiling at above 150° C. is withdrawn at the bottom of the column;
(b) treating said crude mixture consisting essentially of n-butanol and isobutanol with an aqueous solution of an alkali metal hydroxide at a temperature of from 80 to 200° C. and at a pressure of from 1 to 50 atmospheres;
(c) (i) feeding the resulting mixture consisting essentially of n-butanol, isobutanol and an aqueous alkali metal hydroxide solution directly to the distillation column under (d), or
  (ii) treating the resulting mixture consisting essentially of n-butanol, isobutanol and an aqueous alkali metal hydroxide solution with water to remove alkali metal salts and separating a mixture consisting essentially of n-butanol, isobutanol, and water;
(d) distilling off in a second distillation column from said mixture consisting essentially of n-butanol, isobutanol and water or from said mixture consisting essentially of n-butanol, isobutanol and an aqueous alkali metal hydroxide solution aezotrope-forming substances selected from the group consisting of dibutyl ethers, hydrocarbons and dipropyl ketones, water and part of the isobutanol as a ternary azeotrope which is withdrawn at the top of the distillation column and an anhydrous mixture consisting essentially of n-butanl and isobutanol which is withdrawn at the bottom of the distillation column; and
(e) separating said anhydrous mixture consisting essentially of n-butanol and isobutanol by distillation into n-butanol and isobutanol.

2. A process as claimed in claim 1, wherein said first distillation of said reaction mixture is carried out in a column at a pressure of from 500 to 800 mm. Hg.

3. A process as claimed in claim 1, wherein the crude mixture consisting essentially of n-butanol and isobutanol separated by said first distillation is treated with aqueous caustic soda solution at a temperature of from 120° to 190° C. and at a pressure of from 1.5 to 25 atmospheres.

4. A process as claimed in claim 1, wherein the crude mixture consisting essentially of n-butanol and isobutanol separated by said first distillation is treated with aqueous caustic potash solution at a temperature of from 120° to 190° C. and at a pressure of from 1.5 to 25 atmospheres.

5. A process as claimed in claim 1, wherein the mixture consisting essentially of n-butanol, isobutanol and an aqueous alkali metal hydroxide solution is treated with water countercurrent in a column having two to ten theoretical separation stages.

6. A process as claimed in claim 1, wherein the mixture consisting essentially of n-butanol, isobutanol and an aqueous alkali metal hydroxide solution is treated with the aqueous layer obtained at the top of the second distillation column.

References Cited

UNITED STATES PATENTS

| Re. 16,267 | 2/1926 | Stevens | 203—18 |
|---|---|---|---|
| 2,595,763 | 5/1952 | Carlson et al. | 260—643 E |
| 2,614,971 | 10/1952 | Burton | 203—43 |
| 2,636,847 | 4/1953 | Hamner et al. | 260—643 |
| 3,156,629 | 10/1964 | Ester | 260—643 |
| 3,232,848 | 2/1966 | Johnson et al. | 203—35 |

WILBUR L. BASCOMB, JR., Primary Examiner

U.S. Cl. X.R.

203—43, 70, 99, 18; 260—643 E

PO-1050
(5/69)

UNITED STATES PATENT OFFICE
CERTIFICATE OF CORRECTION

Patent No. 3,689,371     Dated September 5, 1972

Inventor(s) Horst Kerber et al

It is certified that error appears in the above-identified patent and that said Letters Patent are hereby corrected as shown below:

Column 1, after line 9, insert -- assignors to Badische-Anilin-& Soda Fabrik Aktiengesellschaft, Ludwigshafen am Rhein, Germany --

Column 1, after line 12, insert -- Claims Priority, application Germany, Dec. 20, 1967, P 13 01 806.9 --

Signed and sealed this 3rd day of April 1973.

(SEAL)
Attest:

EDWARD M. FLETCHER, JR.
Attesting Officer

ROBERT GOTTSCHALK
Commissioner of Patents